(12) United States Patent
Booher (10) Patent No.: US 8,951,136 B1
(45) Date of Patent: Feb. 10, 2015

(54) HIP ROTATION TRAINING SYSTEM

(71) Applicant: Jeffrey Scott Booher, Lincoln, NE (US)

(72) Inventor: Jeffrey Scott Booher, Lincoln, NE (US)

(*) Notice: Subject to any disclaimer, the term of this patent is extended or adjusted under 35 U.S.C. 154(b) by 0 days.

(21) Appl. No.: 14/027,066

(22) Filed: Sep. 13, 2013

Related U.S. Application Data (60) Provisional application No. 61/700,920, filed on Sep. 14, 2012.

(51) Int. Cl.
| A63B 69/36 | (2006.01) |
| A63B 21/00 | (2006.01) |
| A63B 21/02 | (2006.01) |
| A63B 23/00 | (2006.01) |

(52) U.S. Cl.
CPC ............ *A63B 69/3608* (2013.01); *A63B 23/00* (2013.01)
USPC .......................................... 473/215; 473/216

(58) Field of Classification Search
USPC .......... 473/207, 212–216, 266, 277; 482/124, 482/131
See application file for complete search history.

(56) References Cited

U.S. PATENT DOCUMENTS

| 5,048,836 | A | * | 9/1991 | Bellagamba | 473/216 |
| 5,176,600 | A | * | 1/1993 | Wilkinson | 482/124 |
| 5,357,637 | A | * | 10/1994 | Moore | 2/227 |
| 5,792,034 | A | * | 8/1998 | Kozlovsky | 482/124 |
| 6,099,446 | A | * | 8/2000 | Johnson et al. | 482/124 |
| 6,129,638 | A | * | 10/2000 | Davis | 473/215 |
| 7,632,192 | B2 | * | 12/2009 | Begert | 473/216 |
| 2003/0009120 | A1 | * | 1/2003 | MacAllister | 602/23 |
| 2004/0116260 | A1 | * | 6/2004 | Drennan | 482/124 |
| 2005/0261113 | A1 | * | 11/2005 | Wilkinson | 482/124 |

* cited by examiner

*Primary Examiner* — Nini Legesse
(74) *Attorney, Agent, or Firm* — Jeffrey Scott Booher; David H. Milligan, PC LLO (57) ABSTRACT

A hip rotation training system for assisting in training a wearer in proper hip rotation during a swinging movement of the wearer comprises a compression shorts configured to cover a lower portion of the wearer and at least one elastic resistance component having a plurality of elastic tubing. The compression shorts are adapted to furnish compressive support to the lower body portion of the wearer. The at least one elastic resistance component being adapted to deform during a first portion of a swinging movement of the wearer such that the at least one of the plurality of elastic tubing exerts a force partially upon a trailing hip of the wearer to assist in pulling the trailing hip forward during initiation of a second portion of the swinging movement of the wearer.

19 Claims, 6 Drawing Sheets

HIP ROTATION TRAINING SYSTEM

RELATED APPLICATIONS

The present application claims the benefit under 35 U.S.C. §119(e) of U.S. Provisional Application Ser. No. 61/700,920, filed Sep. 14, 2012, entitled HIP-ROTATION TRAINING SYSTEM. U.S. Provisional Application Ser. No. 61/700,920 is herein incorporated by reference in its entirety.

TECHNICAL FIELD OF THE DISCLOSURE

The present invention is related in general to training systems, and in particular to a hip rotation training system.

BACKGROUND

Many sports activities derive power from the rotational movement of the hip. The muscles of the hip and thigh are used in walking, running, and almost every athletic activity. Sports activities like throwing a ball, discus throw, javelin, golf, tennis or base ball require swinging movements and flexibility of muscles to achieve the desired results. Hip rotation plays an important role in these types of sports. The execution of a correct hip rotation is of appreciable significance in particular for precision of aim and distance of the shot for these types of sports. A golf player requires proper dynamic positioning of the hands, the arms, the legs, the torso, the head, and the feet to achieve the most desirable and consistent golf swing.

In golf, the relative movement of the player's hands with respect to the rotation of the player's hips is particularly critical. The player must rotate the hip at the appropriate time, and to the appropriate extent, if he desires to excel in the game. It takes much precise positioning and practice to achieve the most desirable and consistent golf swing. The player's body has to be properly positioned starting from the address position and continuing through the full golf swing. There are numerous golf swing training methods and devices presently available, as is well known to those skilled in the art of golf training. However, these devices have been largely ineffective and cumbersome. For example, such devices fail to properly coordinate different parts of the golfer's body that must work together to achieve an effective swing.

Existing training methods and devices related to movement control for the waist area of a player have considerable drawbacks. For example, a golf swing training harness may be secured to the forward knee, forward wrist, rear elbow, and waist of a golfer to encourage the golfer to keep his or her limbs in correct position as the golfer proceeds through a golf swing. However, such a golf swing training harness is too complicated and does not provide the desired orientation in the hip of the golfer.

Another existing system discloses a hip rotation training device with a base plate, a torsion resisting element such as a torsion spring, a torsion spring attachment rod, an inner vertical support tube, a tube support socket, an outer vertical support tube and a hip retaining assembly. However, a disadvantage of this system is that the user can only guide the swing while standing on the base plate placed on the ground. This only controls the position of the golf club, rather than the body of the user.

Recent advancements in the art provide a hip training device, comprising a base frame, mounted on a horizontal floor; a positioning system, mounted on the base frame; a disc, rotatably supported by the positioning system; and a transmission system. The user during an exercise moves the transmission system with her or his hips, causing a rotational movement of the disc, the disc in turn constraining the transmission system to a circular movement, taking along the user's hips with a training effect for the user's hips. However, this device is disadvantageously cumbersome and can be uncomfortable in use.

Based on the foregoing there is a need for a hip rotating training system that would be simple in construction, relatively small in size and easy to use. Such a needed device would coordinate different parts of the user's body to work together to achieve an effective swing. The device would provide the desired orientation in the hip of the golfer and would be comfortable to use. The present invention overcomes prior art shortcomings by accomplishing these critical objectives.

SUMMARY

To minimize the limitations found in the prior art, and to minimize other limitations that will be apparent upon the reading of the specifications, the preferred embodiment of the present invention provides a hip rotation training system for assisting a wearer in proper hip rotation during a swinging movement.

The present invention discloses a hip rotation training system utilized for assisting a wearer in proper hip rotation during a swinging movement. The hip rotation training system comprises a compression shorts configured to cover the lower portion of the wearer and at least one elastic resistance component to provide a force to the wearer's hip to assist in proper hip rotation during the swinging movement. The compression shorts is configured as form fitting shorts to cover the waist to mid or lower thigh of the wearer. The compression shorts includes a pair of tubular leg portion having an upper portion and a lower portion, a crotch panel portion being attached between the pair of tubular leg portion and an elastic top attachment means attached along the upper portion of the pair of tubular leg portion and the crotch panel portion. The at least one elastic resistance component is adapted to deform during a first portion of the swinging movement of the wearer such that the at least one of the plurality of elastic tubing exerts the force partially upon a trailing hip of the wearer to assist in pulling the trailing hip forward during initiation of a second portion of the swinging movement of the wearer.

In accordance with one embodiment of the present invention, the hip rotation training system is configured to allow the wearer to experience proper hip rotation during the swinging movement (e.g., downswing, backswing or forward swing of a sporting instrument). The hip rotation training system utilizes the compression shorts configured as a form fitting system to cover the lower portion of the wearer. The compression shorts furnish compressive support to the upper leg muscles, the abdomen, and the buttocks of the wearer. The compression shorts can be a garment that extends over substantially all of the wearer's leg. The sporting instrument can be a golf club, tennis racket, baseball bat, etc., or other sporting instrument that requires a swinging motion.

In accordance with another embodiment of the present invention, the at least one elastic resistance component having the plurality of elastic tubing stretches/deforms due to the hip rotation of wearer. This causes the hip rotation training system to build up a potential energy at the pinnacle of the wearer's backswing that allows the system to exert the force on the wearer's hip during the downswing motion. In this embodiment, at the start of the downswing motion, the at least one elastic resistance component returns to the non-deformed state and exerts the force upon the trailing hip such that the plurality of elastic tubing pull the trailing hip forward. The force exerted by the plurality of elastic tubing reinforces the hip to initiate the forward swing.

In accordance with another exemplary embodiment of the present invention, the hip rotation training system utilizes multiple elastic resistance components. The hip rotation training system includes multiple elastic resistance components to assist the wearer in proper hip rotation in either direction. The hip rotation training system may include multiple elastic resistance components to assist the wearer in a sport (e.g., tennis) that requires proper hip rotation during the wearer's forehand and the wearer's backhand. Other exemplary embodiments provide a hip rotation training system designed to assist a right-handed wearer, it is understood that the hip rotation training system may be configured to assist a left-handed wearer as well.

These and other advantages and features of the present invention are described with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

DETAILED DESCRIPTION OF THE DRAWINGS

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

Figure 1A:
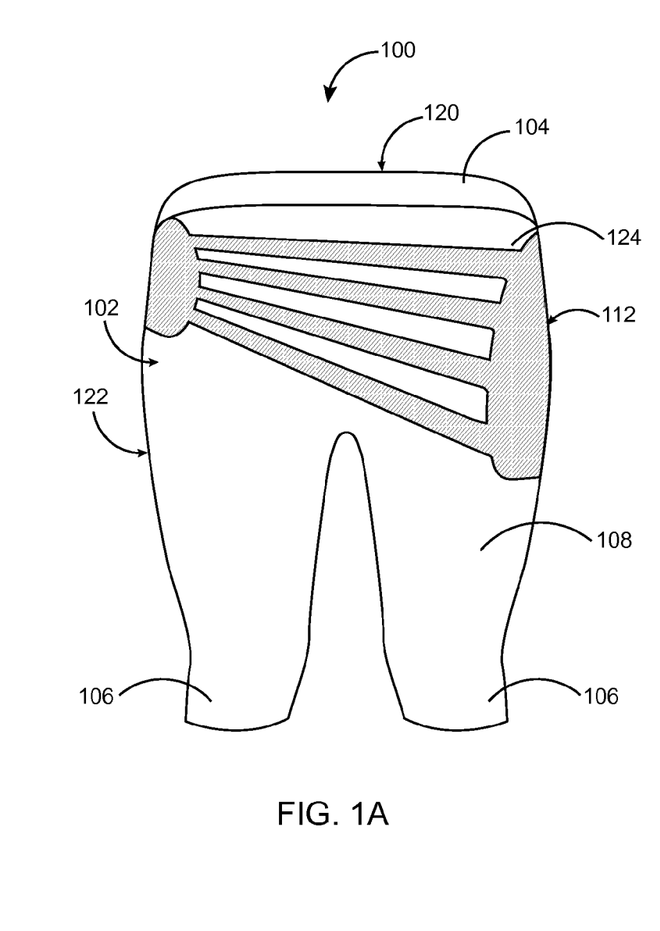
FIGS. 1A and 1B illustrate a perspective view of a preferred embodiment of a hip rotation training system and an at least one elastic resistance component respectively of the present invention.
Figure 1B:
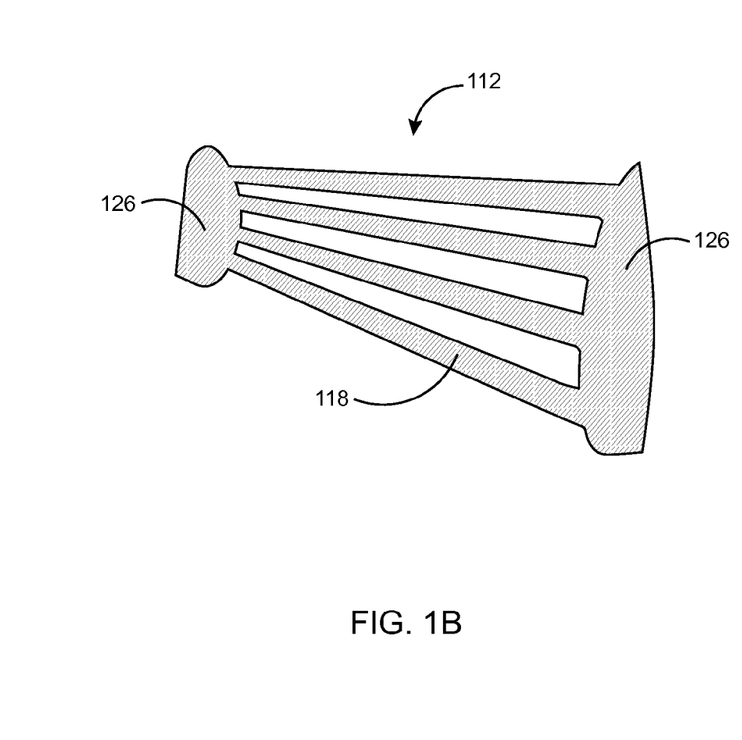

FIGS. 1A and 1B illustrate a perspective view of a preferred embodiment of a hip rotation training system 100 and an at least one elastic resistance component 112 respectively of the present invention. The hip rotation training system 100 is utilized for assisting a wearer in proper hip rotation during a swinging movement. The hip rotation training system 100 comprises a compression shorts 102 configured to cover the lower portion of the wearer and at least one elastic resistance component 112 to provide a force to the wearer's hip to assist in proper hip rotation during the swinging movement. The compression shorts 102 include a first end 114 (see FIG. 2B), a second end 116 (see FIG. 2B), an inner surface 120 and an outer surface 122. The compression shorts 102 is configured as form fitting shorts to cover the waist to mid or lower thigh of the wearer. The compression shorts 102 comprises a pair of tubular leg portion 106 having an upper portion 124 and a lower portion 108, a crotch panel portion 110 being attached between the pair of tubular leg portion 106 and an elastic top attachment means 104 attached along the upper portion 124 of the pair of tubular leg portion 106 and the crotch panel portion 110. The upper portion 124 of the pair of tubular leg portion 106 may be connected to the elastic top attachment means 104 by way of stitching, thermobonding, heat transfer, iron-on application or the like. The at least one elastic resistance component 112 includes a pair of hip attachment members 126 and a plurality of elastic tubings 118. The elastic resistance component 112 is attached between the first end 114 and the second end 116 of the compression shorts 102 on the outer surface 122. The at least one elastic resistance component 112 is adapted to deform during a first portion of the swinging movement of the wearer such that the at least one of the plurality of elastic tubing 118 exerts a force partially upon a trailing hip of the wearer to assist in pulling the trailing hip forward during initiation of a second portion of the swinging movement of the wearer.

Figure 2A:
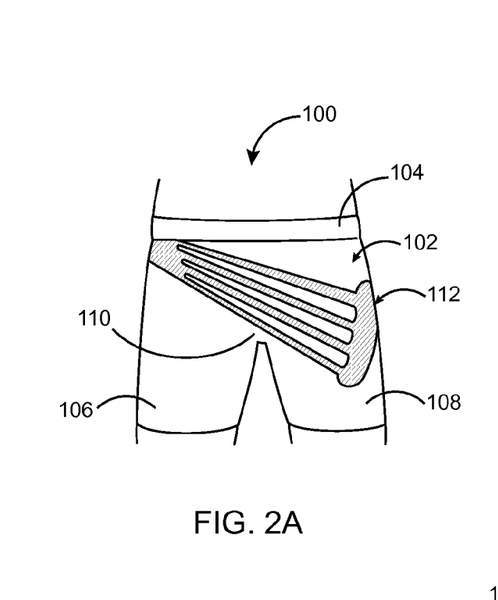
FIGS. 2A-2C illustrate an example implementation of the hip rotation training system in accordance with the preferred embodiment of the present invention.
Figure 2B:
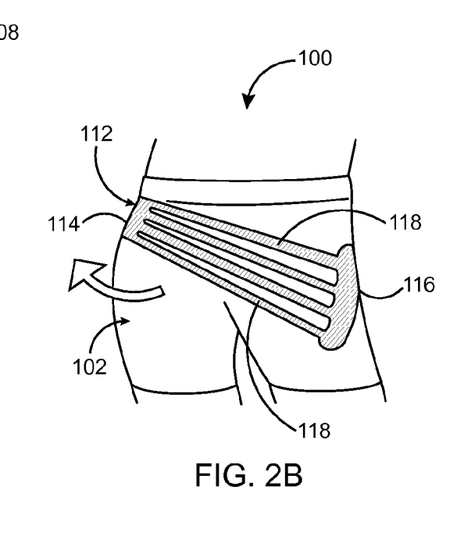
Figure 2C:
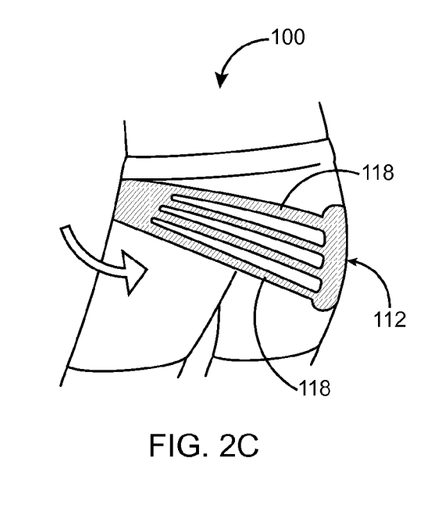

FIGS. 2A-2C illustrate an example implementation of the hip rotation training system 100 in accordance with the preferred embodiment of the present invention. The hip rotation training system 100 is configured to allow the wearer to experience proper hip rotation during the swinging movement like downswing, backswing or forward swing of a sporting instrument. The sporting instrument can be golf club, tennis racket, baseball bat etc. that requires the swinging motion. In an implementation as shown in FIG. 2A, the compression shorts 102 furnish compressive support to the upper leg muscles, the abdomen, and the buttocks of the wearer. The elastic top attachment means 104, configured to surround the waist of the wearer provide an elastic stretchability primarily in the longitudinal direction. In a specific implementation, during the backswing motion of the wearer, the at least one elastic resistance component 112 having a plurality of elastic tubing 118 stretches/deforms due to the hip rotation of wearer as shown in FIG. 2B. This causes the hip rotation training system 100 to build up a potential energy at the pinnacle of the wearer's backswing that allows the system 100 to exert the force on the wearer's hip during the downswing motion. At the start of the downswing motion, the at least one elastic resistance component 112 returns to the non-deformed state and exerts a force upon the trailing hip such that the plurality of elastic tubing 118 pull the trailing hip forward as shown in FIG. 2C. The force exerted by the plurality of elastic tubing 118 reinforces the hip to initiate the forward swing. Thus, the hip rotation training system 100 assists the wearer with the benefit of early hip rotation during the initiation of the downswing.

Figure 3:
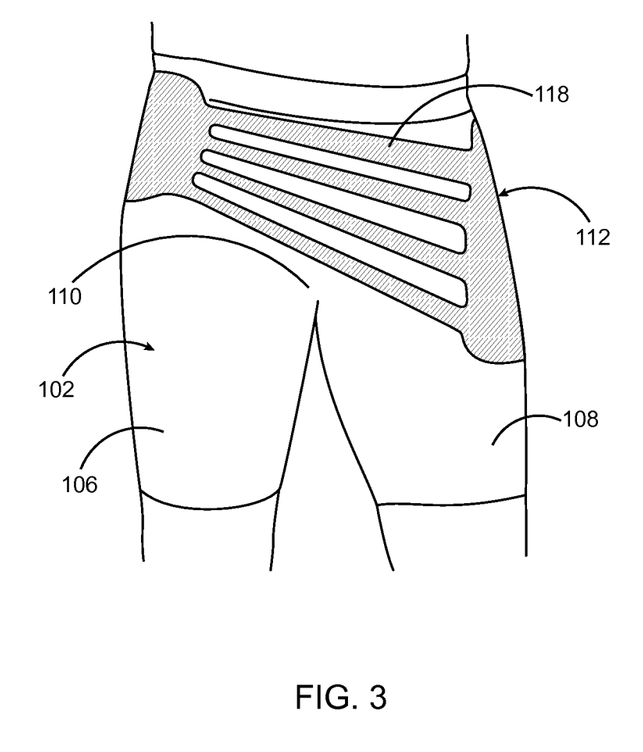
FIG. 3 illustrates the perspective view of a preferred embodiment of the hip rotation training system.

FIG. 3 illustrates the perspective view of a preferred embodiment of the hip rotation training system 100. The compression shorts 102 of the hip rotation training system 100 being configured as form-fitting systems that typically cover the waist to mid or lower thigh of the wearer. The compression shorts 102 may be made from at least one material selected from a group consisting of: spandex, elastic and knit fabric. For example, polyurethane-polyurea copolymer type material may be utilized for manufacturing compression shorts 102. The hip rotation training system 100 provides support to the lower body portion of the wearer that allows the wearer to experience proper hip rotation during the swinging motion. The compression shorts 102 provide the required amount of compressive support to the upper leg muscles, the abdomen, and the buttocks of the wearer. The at least one elastic resistance component 112 may be manufactured from at least one rubber material suitable to undergo elastic deformation under stress. For example, thermoplastic polyurethane may be utilized for manufacturing the at least one elastic resistance component.

Figure 4:
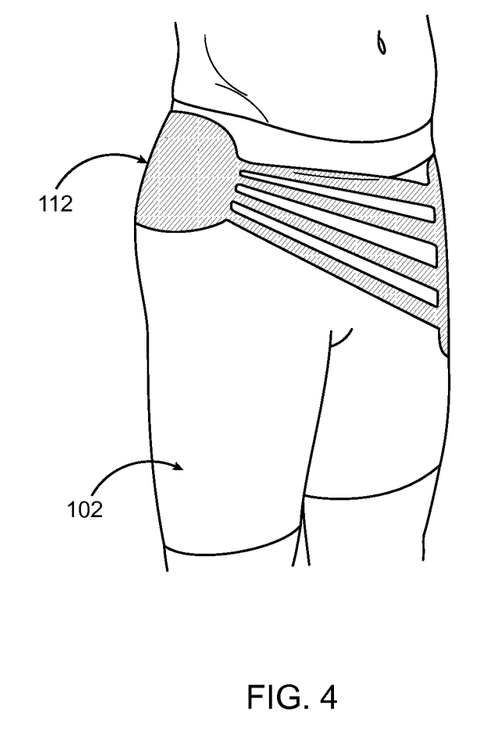
FIG. 4 illustrates the perspective view of a preferred embodiment of the hip rotation training system of the present invention.

FIG. 4 illustrates the perspective view of a preferred embodiment of the hip rotation training system 100 of the present invention. The upper portion 124 of the pair of tubular leg portion 106 may be connected to the elastic top attachment means 104 of the compression shorts 102 by way of stitching, thermobonding, heat transfer, iron-on application, or the like. However, in some implementations, the pair of tubular leg portion 106 and the elastic top attachment means 104 may be integral as well. Other types of form fitting garments such as compression pants that extend substantially over all of the wearer's legs may be utilized without departing from the spirit of the present invention. The at least one elastic resistance component 112 is configured to expand and contract as the wearer rotates his/her hip. The plurality of elastic tubings 118 undergo elastic deformation when under stress and return to the previous size without permanent deformation. In one or more implementations, the at least one elastic resistance component 112 may be manufactured from a rubber material, such as a styrene-butadiene rubbers or thermoplastic polyurethane. However, it is understood that other materials may be utilized that are suitable to undergo elastic deformation when under stress and can return to its previous size, or state, without permanent deformation.

Figure 5:
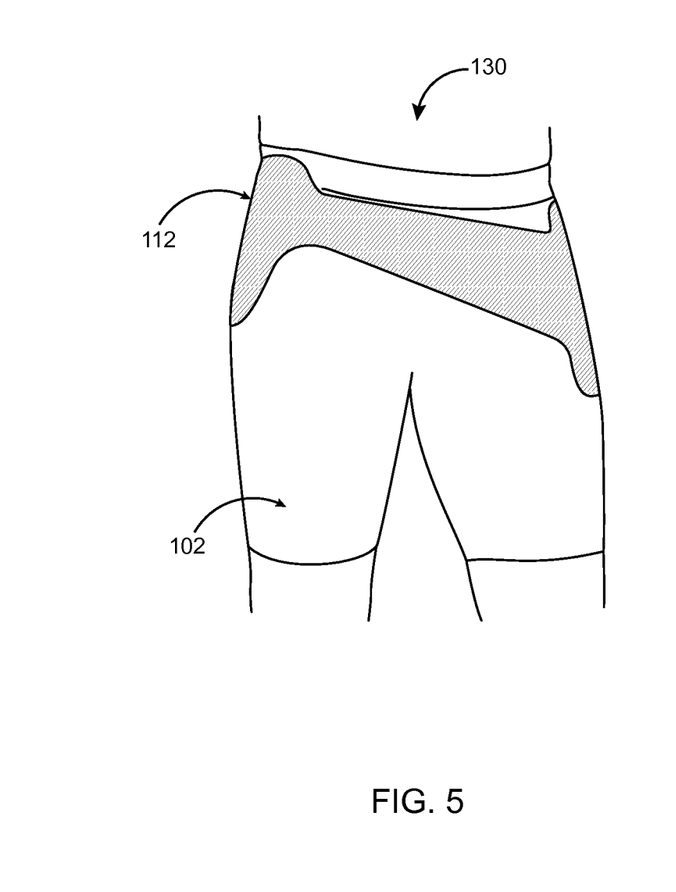
FIG. 5 illustrates the perspective view of an alternate embodiment of the hip rotation training system of the present invention.

FIG. 5 illustrates the perspective view of an alternate embodiment of the hip rotation training system 130 of the present invention. The hip rotation training system 130 comprises a compression shorts 102 configured to cover the lower portion of the wearer and at least one elastic resistance component 112 to provide a force to the wearer's hip to assist in proper hip rotation during a swinging movement. The at least one elastic resistance component 112 for the hip rotation training system includes a pair of hip attachment members 126 configured to provide support to the hip of a wearer and at least a plurality of elastic tubings 118 configured between each of the pair of hip attachment members 126. The plurality of elastic tubings 118 is adapted to deform during swinging movement (e.g., backswing, downswing and forward swing).

Figure 6:
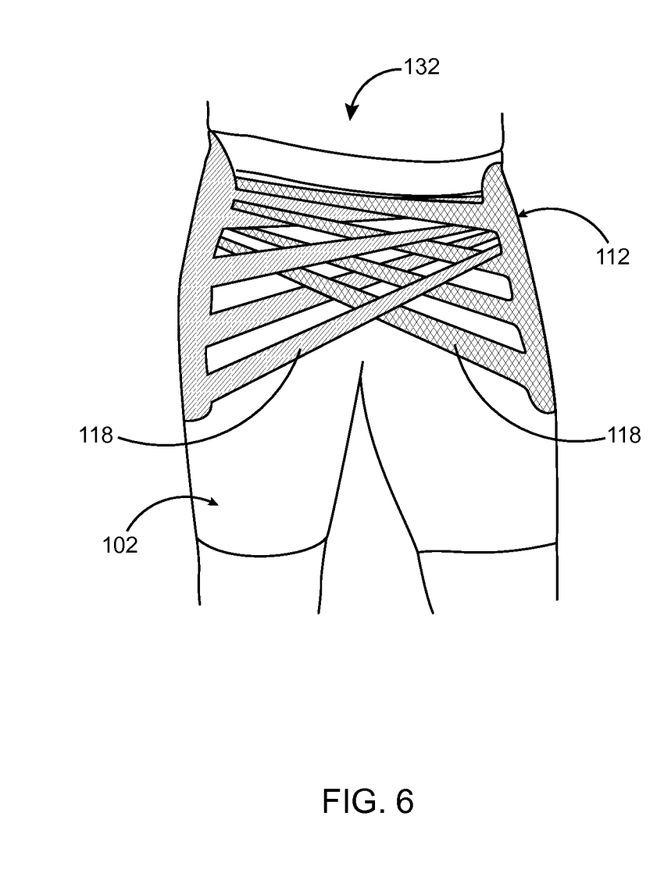
FIG. 6 illustrates the perspective view of an alternate embodiment of the hip rotation training system utilizing multiple elastic resistance components of the present invention.

FIG. 6 illustrates the perspective view of an alternate embodiment of the hip rotation training system 132 utilizing multiple elastic resistance components 112 of the present invention. The hip rotation training system 132 includes multiple elastic resistance components 112 to assist the wearer in proper hip rotation in either direction. The hip rotation training system 132 may include multiple elastic resistance components 112 to assist the wearer in a sport (e.g., tennis), that requires proper hip rotation during the wearer's forehand and the wearer's backhand.

Figure 7:
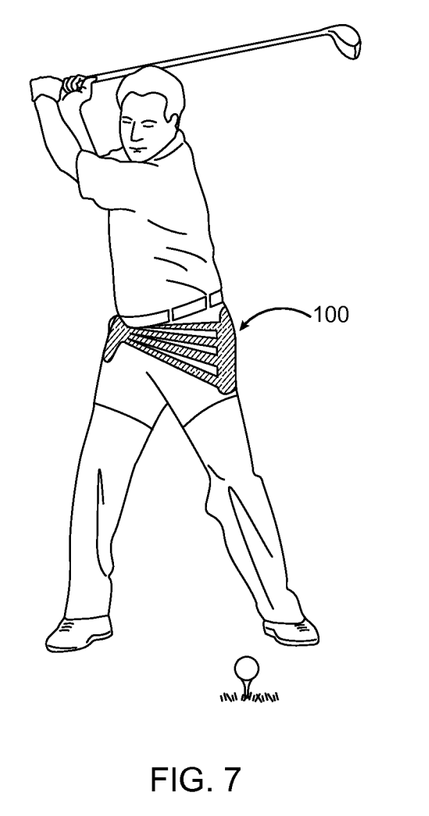
FIG. 7 illustrates the perspective view of a preferred embodiment of the hip rotation training system in use.

FIG. 7 illustrates the perspective view of a preferred embodiment of the hip rotation training system 100 in use. In a specific example of a swing involved in playing golf, initially during the backswing motion of the wearer, the at least one elastic resistance component 112 having a plurality of elastic tubing 118 stretches/deforms due to the hip rotation of wearer. This causes the hip rotation training system 100 to build up a potential energy at the pinnacle of the wearer's backswing that allows the system 100 to exert a force on the wearer's hip during the downswing motion. At the start of the downswing motion, the at least one elastic resistance component 112 returns to the non-deformed state and exerts the force upon the trailing hip such that the plurality of elastic tubing 118 pull the trailing hip forward. The hip rotation training system 100 assists in teaching golfers the benefit of early hip rotation during the initiation of the downswing.

Figure 8:
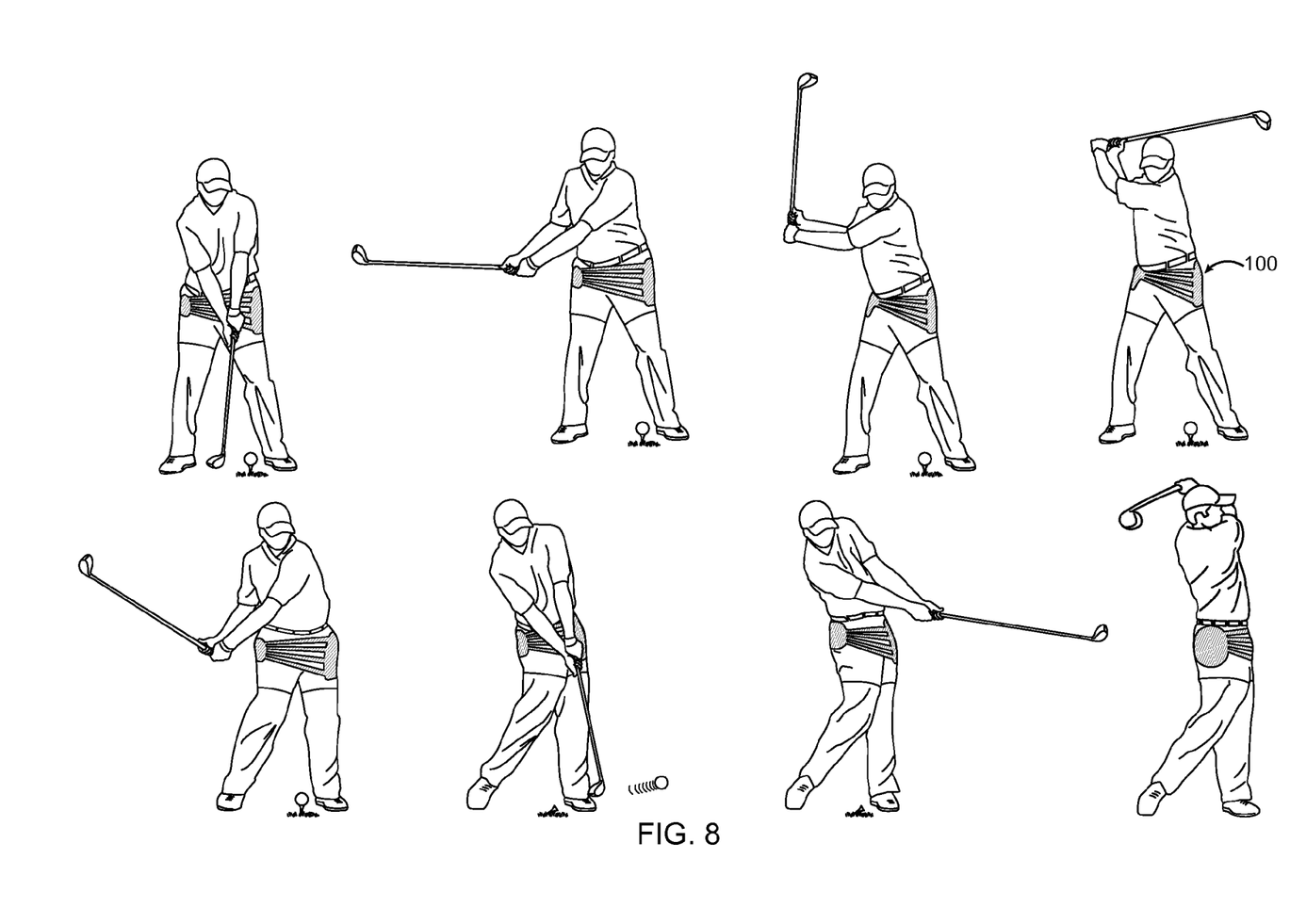
FIG. 8 illustrates an example implementation of the hip rotation training system worn by a wearer in accordance with the preferred embodiment of the present invention.

FIG. 8 illustrates an example implementation of the hip rotation training system 100 worn by a wearer in accordance with the preferred embodiment of the present invention. In a specific example of a swing involved in playing golf, the golfer's shoulders and hips should be parallel to the aim line. Once the golfer begins to initiate a backswing, the shoulders should move first while the hips remain in the initial hip position for a period of time. Eventually, the hips begin to turn to complete the backswing. During the backswing motion of the golfer, the at least one elastic resistance component 112 having a plurality of elastic tubing 118 stretches/deforms due to the hip rotation of golfer. This causes the hip rotation training system 100 to build up a potential energy at the pinnacle of the wearer's backswing. During the downswing, the hips should move first to pull the shoulders behind the hips. The hips should continue to lead the shoulders through the duration of the downswing. The potential energy built up in the hip rotation training system 100 exerts a force on the wearer's hip during the downswing motion. At the start of the downswing motion, the at least one elastic resistance component 112 returns to the non-deformed state and exerts a force upon the trailing hip such that the plurality of elastic tubing 118 pull the trailing hip forward. The force exerted by the plurality of elastic tubing 118 reinforces the hip to initiate the forward swing. Once the golfer strikes the ball, the hips should stop while the shoulders continue to turn past the hips to reach the completion position. Thus, the hip rotation training system 100 assists the wearer with the benefit of early hip rotation during the initiation of the downswing so as to increase the club head speed.

The hip rotation training system 100 is designed to assist a right-handed wearer, it is understood that hip rotation training system 100 may be configured to assist a left-handed wearer as well. Additionally, the system 100 may assist in training the body and the brain of the wearer to drive the trailing hip forward utilizing rotational velocity.

What is claimed is:

1. A hip rotation training system for assisting a wearer in proper hip rotation during a swinging movement, comprising:
    a compression shorts having a first end, a second end, an inner surface and an outer surface configured to cover a lower portion of the wearer, the compression shorts comprising:
        a pair of tubular leg portions having an upper portion and a lower portion;
        a crotch panel portion being attached between the pair of tubular leg portion; and an elastic top attachment means connected along the upper portion of the pair of tubular leg portions and the crotch panel portion; and at least one elastic resistance component having a plurality of elastic tubing, wherein the at least one elastic resistance component is attached between the first end and the second end of the compression shorts on the outer surface;

whereby the elastic tubing of the at least one elastic resistance component deforms during a first portion of the swinging movement and exerts a force on a trailing tip of the hip of the wearer to assist in pulling the trailing hip forward during an initiation of a second portion of the swinging movement.

2. The hip rotation training system of claim 1, wherein the compression shorts are configured as form fitting shorts to cover a lower body portion of the wearer.

3. The hip rotation training system of claim 1, wherein the compression shorts provide support to a lower body portion of the wearer.

4. The hip rotation training system of claim 1, wherein the compression shorts allow the wearer to experience proper hip rotation during the swinging motion.

5. The hip rotation training system of claim 1, wherein the compression shorts are made from at least one material selected from a group consisting of:
spandex, elastic and knit fabric.

6. The hip rotation training system of claim 1, wherein the elastic top attachment means is configured to surround the waist of the wearer.

7. The hip rotation system of claim 1, wherein the compression shorts extend over a majority of the wearer's leg.

8. The hip rotation training system of claim 1, wherein the at least one elastic resistance component is configured to expand during the backswing motion of the wearer.

9. The hip rotation training system of claim 1, wherein the at least one elastic resistance component is configured to contract during the downswing motion of the wearer.

10. The hip rotation training system of claim 1, wherein the elastic resistance component is manufactured from at least one rubber material suitable to undergo elastic deformation under stress.

11. The hip rotation training system of claim 1, wherein at least one of the plurality of elastic tubings deforms during the swing motion and exerts the force on the wearer's hip to initiate the hip rotation.

12. The hip rotation training system of claim 1, wherein the elastic resistance component builds up a potential energy at the pinnacle of the wearer's backswing and exerts the force on the wearer's hip to initiate a forward swing.

13. An elastic resistance component for a hip rotation training system which includes compression shorts having a first end, a second end, an outer surface, a pair of tubular leg portions having an upper portion and a lower portion, a crotch panel portion being attached between the pair of tubular leg portions, and an elastic top attachment element connected along the upper portion of the pair of tubular leg portions and the crotch panel portion, the elastic resistance component comprising:

at least one elastic resistance component having a plurality of elastic tubing, wherein the at least one elastic resistance component is attached between the first end and the second end of the compression shorts on the outer surface;

whereby the at least one elastic tubing deforms during a first portion of the swinging movement and exerts a force on a trailing tip of the hip of the wearer to assist in pulling the trailing hip forward during an initiation of a second portion of the swinging movement.

14. The elastic resistance component of claim 13, wherein the at least one of the plurality of elastic tubings is configured to expand during the swinging movement.

15. The elastic resistance component of claim 13, wherein the at least one of the plurality of elastic tubings is configured to contract during the swinging movement.

16. The elastic resistance component of claim 13, wherein the elastic resistance component is manufactured from at least one rubber material suitable to undergo elastic deformation under stress.

17. The elastic resistance component of claim 13, wherein at least one of the plurality of elastic tubings deforms during the swing motion and exerts a force on the wearer's hip to initiate the hip rotation.

18. The elastic resistance component of claim 13, wherein the elastic resistance component builds up a potential energy at a pinnacle of the wearer's backswing and exerts a force on the wearer's hip to initiate a forward swing.

19. The elastic resistance component of claim 13, wherein at least one of the plurality of elastic tubings deforms during a first portion of the swinging movement and exerts a force partially on the trailing tip of the wearer to assist in pulling the trailing hip forward during initiation of the second portion of the swinging movement.

\* \* \* \* \*